Oct. 28, 1924.　　　　　　　　　　　　　　　　1,513,333
F. M. McLEAN
COLLAPSIBLE WHEEL STRUCTURE
Filed March 3, 1924
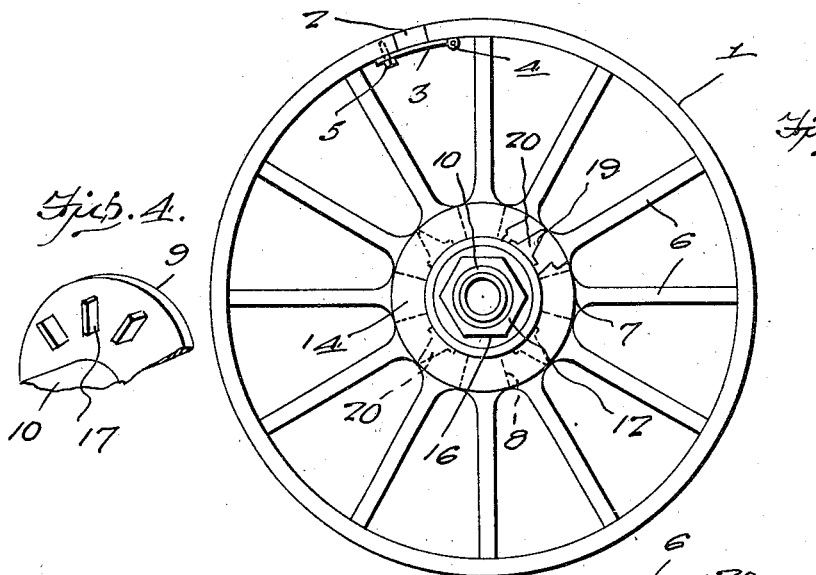
Fig. 1.
Fig. 4.
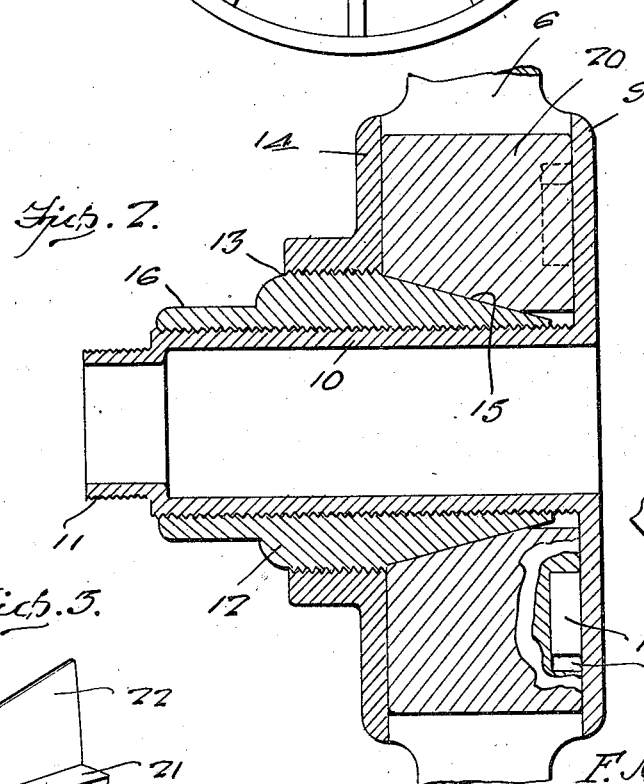
Fig. 2.
Fig. 5.
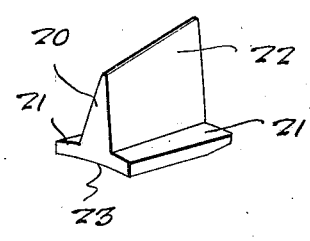
Fig. 3.
Inventor
F. M. McLean
By Clarence A. O'Brien
Attorney Patented Oct. 28, 1924.

1,513,333

UNITED STATES PATENT OFFICE.

FRED M. McLEAN, OF WHITTIER, NORTH CAROLINA.

COLLAPSIBLE WHEEL STRUCTURE.

Application filed March 3, 1924. Serial No. 696,551.

*To all whom it may concern:*

Be it known that I, FRED M. MCLEAN, a citizen of the United States, residing at Whittier, in the county of Swain and State of North Carolina, have invented certain new and useful Improvements in Collapsible Wheel Structures, of which the following is a specification.

This invention relates to improvements in wheel structures, and particularly to a wheel structure wherein the spokes are radially movable for permitting the collapsing, or decreasing of the size of the rim, to permit the removal of a casing when used in connection with automobile wheels.

An object of the invention resides in providing a wheel structure, wherein the rim is formed with a removable section, while the spokes are adapted for radial movement in the hub portion which is provided with means for controlling the radial movement of the spokes for projecting them to hold the rim in expanded relation.

Another object of the invention resides in providing radially movable spokes positioned between the usual retaining plates, wherein one of said plates is provided with a tubular extension projected through the opening formed in the other plate, for receiving a rotatable member adapted to mount the other hub plate, and movable on the tubular extension of the base plate, for cooperation between said plates, to project the spokes into rim expanding position, or permit the radial inward movement thereof for collapsing the rim.

The invention includes other objects and improvements in the details of construction, and arrangement of the parts, which are more particularly pointed out in the following description and claim, directed to the preferred form of the invention, it being understood, however, that variations may be made from the specific construction, without departing from the scope of the invention as described and claimed.

In the drawing, forming a part of this application:

Figure 1 is a side view of a wheel constructed according to the invention.

Figure 2 is a vertical sectional view, through the hub portion of said wheel.

Figure 3 is a detail perspective view, showing a wedge block in disassembled relation.

Figure 4 is a detail perspective view of a portion of the hub plate, carrying the tubular extension.

Figure 5 is a detail perspective view of a portion of the spoke assembly, showing the manner in which the wedge blocks are assembled therein, and the slots which cooperate with projections on the hub plates for limiting the radial movement on the spokes, and preventing twisting thereof during operation.

The rim of the wheel is indicated at 1, and is of the usual collapsible spring type, being formed with a removable section 2, mounted on a plate 3, hingedly connected to one end of the rim, as indicated at 4, and provided with a removable bolted connection 5, with the other end of the rim, so that, in expanded relation, the section 2 fits between the ends of the main portion of the rim, the bolt locking the plate 3, in the position shown in Figure 1, so that a complete expanded rim is formed for receiving and retaining an automobile tire casing thereon, the section of the ring being of any suitable form, such as used for mounting automobile tire casings.

A plurality of spokes are indicated at 6, which have the outer ends directly secured to the rim 1, in any suitable or desired manner well known in the art, the inner ends thereof being formed with heads 7, provided with radially formed side faces 8, adapted to contact with the corresponding radial sections, in assembled relation. An inner hub plate is indicated at 9, and is of annular form, adapted to receive and fit the inner side of the head 7 of the spoke, the central portion of said plate being formed with a tubular extension 10, projecting outwardly from the plate and formed with a reduced end portion 11, adapted to receive the usual hub cap. The outer periphery of the extension 10 is screw threaded for receiving a rotatable member 12, internally screw threaded, for mounting and threaded cooperation on the tubular extension, said member having an enlarged diameter, threaded as indicated at 13, for receiving and mounting the outer hub plate 14, as clearly shown in Figure 2. From the enlarged diameter 13 of the rotatable member, which is positioned at the central portion thereof, the member tapers toward the inner end, and the axis thereof, as indicated at 15, the purpose of which will be described, while the outer end of the member is provided with a hexagonal head 16, adapted to receive a wrench or other suitable means for applying and adjusting the member on the tubular extension 10.

The inner hub plate 9 is formed with a plurality of lugs arranged in radial relation, as indicated at 17, adapted to project into slots 18, formed in each of the inner faces of the head 7, on the spokes, for permitting the radial movement of the spokes relative to the hub plates, and for guiding and limiting the spokes in said radial movement, these lugs also preventing a twisting of the spokes in circumferential relation to the hub plates.

Certain of the spokes have their adjacent spaces 8, in the heads 7, cut away, as indicated at 19, to form recesses, adapted to receive wedge blocks 20, having flanged base portions 21, from which extend the tapering walls 22, adapted to contact with the cut away portion 19 of the adjacent spoke for exerting a wedging action thereon to hold the spokes in tight relation, between the hub plates, when the rim is in expanded relation, as shown in Figure 1. The inner or bottom surface of the wedge clamps 20 are curved as indicated at 23, for contact with the tapered face 15 of the rotatable member, said curved face being inclined relative to the main portion of the block, as indicated in Figure 3, in order to provide a bearing for contact with the tapered face 15 of the rotatable member.

In the use of this wheel, the rotatable member 12 is rotated on the tubular extension 10 to move it outwardly relative to the inner hub plate 9, in which position, the hub plate 14 will be moved away from contact with the spoke head 7, while the spoke may be moved inwardly, the wedge blocks 20 being moved inwardly toward the tubular extension 10 on the hub, this permitting sufficient space between the several heads 7 on the spoke, in order to permit them to be moved toward the hub or tubular extension on the inner hub plate, the bolt connection 5 being previously removed, so that the rim section 2 can be swung out of contact, and positioned between the ends of the rim, for permitting the same to be collapsed, after which a tire casing may be applied to the rim, in the usual manner, and without difficulty.

To expand the rim, the rotatable member is now screwed inwardly on the tubular extension 10, toward the inner hub plate 9, the tapered base thereof forcing the spokes and the wedge blocks 20, outwardly, in radial relation, to the tubular extension 10, in order to force the rim 1 outwardly, into the position shown in Figure 1, so that the section 2 of the rim may be moved into the position shown in Figure 1, and locked in place. In this position, the rim will hold the tire thereon in the usual manner, so that the same may be inflated and placed on the wheel. After the operation of the rotatable member for pushing the spokes radially outwardly, the outer hub plate 14 will be forced inwardly against the outer face of the spoke heads 7, so that in the expanded relation, the hub plate 14 will cooperate with the plate 9, and the rotatable member for rigidly holding the wheel in assembled and expanded relation. The projection 17 fitting in the slots 18 of the spoke head, will effectively guide the spokes throughout a radial movement relative to the hub, and prevent circumferential twisting of the spokes on the hub, either during the collapsing or expansion of the rim, or after the same is expanded, and in use.

From the above description, it should be apparent that a wheel structure is provided, by the present invention, having radially movable spokes adapted to be rigidly secured in projected relation by the rotatable member mounted on the tubular extension of one of the hub plates, while the other hub plate is mounted on the member and forced into cooperation with the other hub member for holding the spokes in projected and assembled relation.

From this assemblage of the parts, in forming the wheel structure, it will therefore be clear that the rim 1 may be readily collapsed or expanded, in order to permit the removal or application of a tire thereto.

What is claimed is:

A wheel structure of the class described including a sectional collapsible rim, a plurality of radially extended spokes mounted in said rim and adapted for radial movement in the collapsing or expanding of the rim, certain of said spokes being formed with recesses at the inner adjacent ends, wedge blocks movable in said recesses, a pair of hub plates adapted for cooperation to secure said spokes in rigid assembled relation, one of said plates being formed with projections fitting in the slots formed in said spokes, for guiding the spokes in their radial movement, and a rotatable member mounted for rotatable and axial movement on a tubular extension formed on one of said plates for permitting the contraction and expansion of the rim, and forcing the spokes radially outward, said member also operating the wedge blocks for insuring a tight fit between the inner adjacent ends of the spokes, said rotatable member also operating the other hub plate relative to the first mentioned hub plate for producing a cooperation therebetween, to rigidly secure the spokes in assembled relation when the rim is in expanded position, and to form a rigid wheel structure.

In testimony whereof I affix my signature.

FRED M. McLEAN.